US006866066B2

(12) United States Patent
Weber

(10) Patent No.: US 6,866,066 B2
(45) Date of Patent: Mar. 15, 2005

(54) HYDRAULIC ACCUMULATOR

(75) Inventor: Norbert Weber, Sulzbach/Saar (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/399,857

(22) PCT Filed: Nov. 7, 2001

(86) PCT No.: PCT/EP01/12842

§ 371 (c)(1), (2), (4) Date: Apr. 23, 2003

(87) PCT Pub. No.: WO02/40871

PCT Pub. Date: May 23, 2002

(65) Prior Publication Data

US 2004/0028542 A1 Feb. 12, 2004

(30) Foreign Application Priority Data

Nov. 16, 2000 (DE) ........................................ 100 57 746

(51) Int. Cl.[7] ................................................ F16L 55/04

(52) U.S. Cl. .......................... 138/31; 138/26; 251/282; 137/504; 303/87; 220/721

(58) Field of Search ............................. 138/30, 31, 26; 251/24, 26, 282; 137/115.26, 504; 303/87; 220/721

(56) References Cited

U.S. PATENT DOCUMENTS

| | | | | | |
|---|---|---|---|---|---|
| 2,828,760 | A | | 4/1958 | Taylor et al. | 138/314 |
| 2,986,158 | A | | 5/1961 | Gratzmuller | 137/467 |
| 3,077,896 | A | * | 2/1963 | Raymond | 137/491 |
| 3,537,357 | A | * | 11/1970 | Packer | 92/90 |
| 3,741,692 | A | | 6/1973 | Rupp | 417/540 |
| 3,757,523 | A | * | 9/1973 | Resuggan | 60/477 |
| 3,804,125 | A | * | 4/1974 | Sonneman | 138/30 |
| 3,967,782 | A | * | 7/1976 | Eschbaugh et al. | 236/92.3 |
| 4,162,692 | A | | 7/1979 | Greer et al. | 138/30 |
| 4,186,777 | A | | 2/1980 | Klope et al. | 138/31 |
| 4,207,563 | A | | 6/1980 | Soupal | 340/626 |
| 4,256,145 | A | * | 3/1981 | Phillips | 138/31 |

(List continued on next page.)

FOREIGN PATENT DOCUMENTS

| | | | | | |
|---|---|---|---|---|---|
| DE | 2707469 | | | 8/1977 | |
| DE | 3941241 | | | 6/1991 | |
| DE | 4231991 | | | 3/1994 | |
| DE | 19930101 | | | 1/2001 | |
| EP | 0816142 | | | 1/1998 | |
| JP | 57025502 | A | * | 2/1982 | F15B/1/04 |

*Primary Examiner*—Patrick Brinson
(74) *Attorney, Agent, or Firm*—Roylance, Abrams, Berdo & Goodman L.L.P.

(57) ABSTRACT

A hydraulic accumulator, especially a piston accumulator, includes an accumulator housing (10) with at least one gas chamber (12) and a fluid chamber (14). These chambers are separated from each other by a separating element (16). At least one of these chambers (12, 14) can be filled with a pressure medium or at least partially emptied through at least one valve control unit (26) which has switching valves (28, 30). One switching valve (28) is accommodated in a corresponding valve location (29), and can be moved in the direction of movement of the separating element (16) from an opening position into closing position and vice-versa. Expensive line network between the hydraulic accumulator and the valve control unit is avoided. Sealing or leakage problems, such as are common in a line network, never occur. The valve control unit (26) is accommodated in a valve block (24) which is independent from the housing (10). The valve block (24) has an additional valve location (31) for an additional switching valve (30) for performing another switching task. The valve locations (29, 31) are configured essentially identically and are situated eccentrically in relation to the longitudinal axis (33) of the hydraulic accumulator for modular use of the switching valves (28, 30), which are configured as identical parts.

9 Claims, 1 Drawing Sheet

U.S. PATENT DOCUMENTS 4,487,226 A 12/1984 Chun .......................... 138/30
4,966,200 A * 10/1990 Bents .......................... 138/31
4,997,009 A * 3/1991 Niikura et al. ................ 138/30
5,342,080 A 8/1994 Machida .................... 280/6.15
5,353,840 A * 10/1994 Paley et al. ................... 138/31
5,797,430 A 8/1998 Beckē et al. .................. 138/30
6,478,051 B1 * 11/2002 Drumm et al. ............... 138/30
6,478,052 B1 * 11/2002 Conley et al. ................ 138/30
6,484,756 B1 * 11/2002 Weber ......................... 138/30

* cited by examiner

HYDRAULIC ACCUMULATOR

FIELD OF THE INVENTION

The present invention pertains to a hydraulic accumulator, especially a piston accumulator, with an accumulator housing and at least one gas chamber and a fluid chamber that are separated from one another inside the housing by a separating element. At least one of the chambers can be filled with a pressure medium via a valve control unit that has at least one on-off valve. The medium can be at least partially drained therefrom via the valve control unit. The on-off valve is housed in an appropriate valve recess, and can move from an open position to a closed position in the direction of motion of the separating element and vice versa.

BACKGROUND OF THE INVENTION

One of the main purposes of hydraulic accumulators is, among other things, to accommodate certain volumes of pressurized fluids of a hydraulic system and to feed these volumes back to the system upon demand. Hydraulic accumulators of this type that are in common use include piston accumulators, bladder accumulators, diaphragm accumulators, and weight-loaded and spring-loaded accumulators. Hydraulic accumulators of this kind can be used to perform a variety of tasks, such as storing energy, damping shock, oscillation and pulsation, recovering energy, compensating for volume flow, etc.

Valve control units that are commonly equipped with on-off or way valves to control the flow of fluid to and from the hydraulic accumulator are used to operate the hydraulic regulators and control them. In this connection, the hydraulic accumulator is commonly connected to pipework or fluid conduits by fluid lines that provide the fluid-carrying connection between the accumulator and the valve control unit. Drawbacks of the known solution, as embodied in a wide variety of designs that are readily available on the market, include sealing problems caused by the large number of connections between the hydraulic accumulator pipework and the valve control unit and by the added costs for the network of lines connecting to the fluid lines. Especially under cramped conditions, there are also problems with accommodating the large number of the above-mentioned components in a reasonable fashion and connecting them together in such a way that they can carry fluid. Since different manufacturers produce the hydraulic accumulators, the pipework, and/or the valves of the valve control units, mating problems arise at the site where the installation work is actually done.

DE-A-27 07 469 discloses a hydraulic accumulator, especially in the form of a device for regulating pressure. This known hydraulic accumulator accomplishes the tasks of keeping the pressure in the accumulator at a given level and protecting the accumulator against any accidental overpressure. To accomplish these tasks, the hydraulic accumulator has a valve slider, like a hollow sleeve, located inside a valve recess extending along the longitudinal axis of the hydraulic accumulator. The valve slider receives the high pressure at its middle. At one of its ends, the valve slider is subjected to the operating pressure to be regulated. At its other end, the valve slider rests against a support body on which an adjustable spring exerts a counteracting force. Since the surface area of the contact circle between the sleeve and the support body is smaller than the surface area of the cross-section of the sleeve itself, the displacements of the sleeve against the spring cause the inlet opening through which the high pressure enters to close like an on-off valve. This known valve arrangement is an integral part of the lower half of the housing of the accumulator. The lower half can be screwed together with the upper half of the housing, thereby forming the housing of the hydraulic accumulator. With the known solution, the separating element includes an elastic-rubber diaphragm equipped with a closing unit in the middle, so that the switching direction of the on-off valve coincides with the direction of motion of the separating element. If the on-off valve fails in this known solution, for maintenance purposes, the valve block that contains the on-off valve has to be removed together with the lower half of the housing or the appropriate replacement has to be made. This requirement increases the production and maintenance costs in the known solution. Although the valve control unit with the known on-off valve is designed to be large in terms of geometry, only one valve function can be performed in terms of triggering the separating element.

For a piston pressure accumulator, especially for drive-slip-controlled braking systems, DE-A-39 41 241 discloses an on-off valve in the form of a load valve. To save space, the valve direction of motion is arranged perpendicular to the direction of motion of a pressure accumulator piston, as well as to the direction of motion of a shaped part that surrounds it as a partition unit for the accumulator. This piston is placed above a monitoring switch, as a motion sensor for the shaped part in a valve block of the valve control unit of the piston pressure accumulator. With this known arrangement, however, only a single switching task is accomplished. Since the on-off valve is installed in a transverse position, the valve control unit still requires a relatively large amount of room. Moreover, the transverse installation position makes it necessary to divert the fluid stream, which is undesirable from the standpoint of fluid mechanics.

EP-A-0 816 142 and U.S. Pat. No. 5,342,080 disclose hydraulic accumulators. These known solutions ensure modular installation of the on-off valves, which are designed as identical parts, so that a number of switching functions can be performed with respect to a hydraulic accumulator, despite the compact dimensions of the valve control unit. One on-off valve can actuate the separating element. Another on-off valve can be used for other purposes, for example, to control the gas volume in the gas chamber of the hydraulic accumulator. To the extent that these known solutions are used in overall devices, the other on-off valve can also perform other switching tasks relating to adjacent fluid-bearing units, for example, in the form of cooling pumps, hydraulic cylinder devices, etc.

Since the switching direction of the on-off valves runs or extends parallel to the direction of motion of the separating element as well as in the longitudinal direction of the hydraulic accumulator, it is possible to control the flows of fluid in ways that are favorable from the standpoint of fluid mechanics without diverting the flows. Since the on-off valves are designed as identical parts, the valve control unit and also the hydraulic accumulator can be designed in a very cost-effective manner. If a certain on-off valve is not required for a certain use of the hydraulic accumulator, this valve can also be simply left out of the design and the recess can be closed off with a filler plug. Alternatively, this valve can be used in other ways to guide the fluid. If the actual hydraulic accumulator or its valve control unit fails, these devices can be readily detached from one another and replaced with new components so that the overall function of the hydraulic system in the application of the hydraulic accumulator is not put at risk.

With the solutions of this type, the on-off valves are connected to the corresponding hydraulic accumulator as detachable parts. Sealing problems can arise, and mechanical stress, for example, can cause the respective valve control unit to be separated or torn away from the accumulator housing.

SUMMARY OF THE INVENTION

Objects of the present invention are, while retaining the above-described advantages, to provide a hydraulic accumulator that requires little overall installation space and allows the hydraulic accumulator to be securely connected to the on-off valves, which are designed as identical parts, while ensuring a secure seal.

According to the present invention, the valve recesses are of essentially the same design. The control block with its extension is in close contact with the inside circumference of the accumulator housing, and extends into the housing. The accumulator housing rests with its one free end against a shoulder of the control block, where the extension originates. Secure sealing of the connection between the accumulator housing and the control block extension is then provided. Moreover, the shoulder makes it possible to position the accumulator housing precisely with respect to the rest of the control block and to ensure that the accumulator housing is safely guided along the extension of the control block. Accidental detachment of the accumulator housing from the valve control unit is reliably prevented.

In a preferred embodiment of the hydraulic accumulator according to the present invention, the control block forms the boundary for the fluid chamber by means of its extension. The control block then has at least one fluid channel that empties with its free end into the fluid chamber and is connected with its other free end to the on-off valve. Since the control unit makes a transition directly into the fluid chamber, the free paths for the pressure medium are kept short, ensuring fast reaction times for the hydraulic accumulator.

Other preferred embodiments are described.

Other objects, advantages and salient features of the present invention will become apparent from the following detailed description, which, taken in conjunction with the annexed drawings, discloses one preferred embodiment of the present invention.

BRIEF DESCRIPTION OF THE DRAWINGS

Referring to the drawings which form a part of this disclosure.

DETAILED DESCRIPTION OF THE INVENTION

Figure 1:
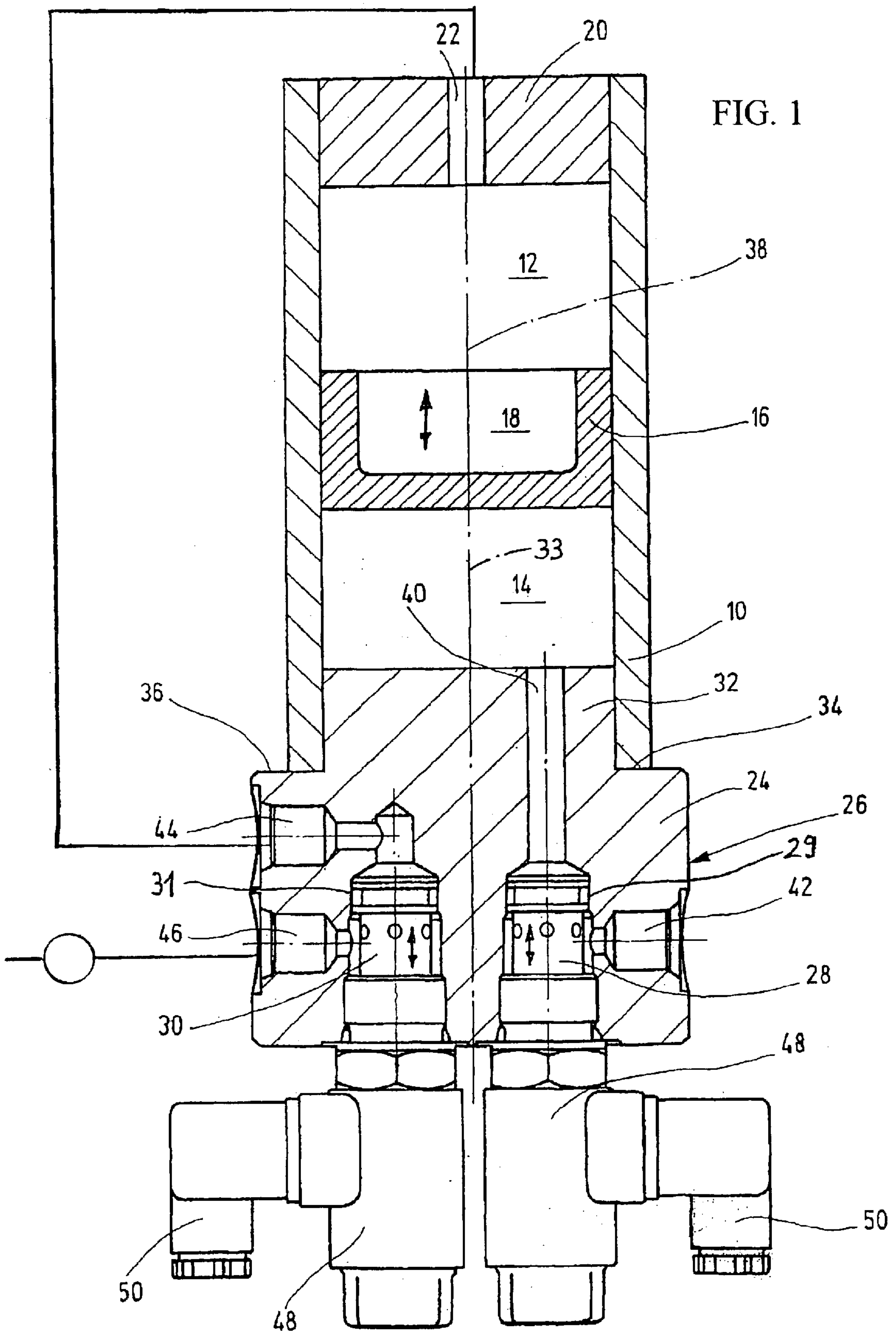
FIG. 1 is a side elevational view in partial section of a hydraulic accumulator according to one embodiment of the present invention.

The illustrated hydraulic accumulator is designed as a piston accumulator. This accumulator has an accumulator housing 10 with a gas chamber 12 and a fluid chamber 14 located in the housing. The gas chamber 12 is separated from the fluid chamber 14 by a separating element 16 in the form of a piston part. The separating element can be moved longitudinally along the inside circumference or surface of the accumulator housing 10 (as indicated by the double-headed arrow therein) so that the spatial relationship between the gas chamber 12 and the fluid chamber 14 is kept variable. In order to be able to store a large quantity of working gas in the gas chamber 12, the separating element 16 is designed as a hollow part. Its inside has a corresponding recess 18. In the direction of the illustration, the gas chamber 12 is closed at the top by a cover part 20 having a center hole 22. The working gas, for example, nitrogen gas, can be brought into the gas chamber 12 through the center hole. The corresponding center hole 22 is then sealed gas-tight by means of a closing valve or similar device (not shown). The quantity of gas in the gas chamber 12 can also subsequently be checked and supplemented periodically via the closing valve.

At the opposite end of the accumulator housing 10, a valve control unit 26 is provided in the form of a control block 24. The valve control unit 26 has two on-off valves, a first on-off valve 28 and a second on-off valve 30. The valve control unit 26 is also an integral part of the accumulator housing 10. For this purpose, control block 24 includes a projection or extension 32 in direct contact with the inside circumference or surface of the accumulator housing 10 and extending into the housing. Moreover, the accumulator housing 10 rests with its one free end 34 against a shoulder 36 of the control block 24. Extension 32 originates at the shoulder. Compared to the rest of the outside diameter of the control block 24, the extension 32, that extends into the accumulator housing, is reduced in diameter in accordance with the decrease in size via the shoulder 36.

The hydraulic accumulator according to the present invention is characterized by the valve control unit 26 being housed in a valve block 24 that is self-contained relative to the housing 10. The valve block 24 has another valve recess 31 for second on-off valve 30, which performs another switching task. The valve recesses 29, 31 are substantially identical and are arranged off-center from the longitudinal axis 33 of the hydraulic accumulator to ensure the modular installation of the on-off valves 28, 30. These on-off valves are designed as substantially identical parts, and move in the directions of the double-headed arrows therein, and in the direction of movement of separating element 16.

With the upper end of the extension 32, the control block 24 limits the fluid chamber 14 in the downward direction of the illustration. The accumulator housing 10, the chambers 12 and 14, the cover part 20, the piston part 16, and the extension 32 are designed essentially as cylindrical components and extend along a common longitudinal axis 38 of the hydraulic accumulator. The control block 24 also has a fluid channel 40 arranged off-center from the longitudinal axis 38, emptying at its one free end into the fluid chamber 14 and connected at its other free end to the first on-off valve 28. Extending transverse to the fluid channel 40, the control block 24 has a transverse connection 42 to which a fluid line, for example, as part of a hydraulic circuit, could be connected. The first on-off valve 28 is then connected between the transverse connection 42 and the fluid channel 40. The fluid-carrying connection between the transverse connection 42 and the fluid channel 40 is open in the one switch position and is closed in the other switch position. Preferably, the first on-off valve 28 is accordingly designed as a so-called 2/2-way valve. It would also be conceivable, however, to install other valves here, such as way-slider valves, valves with damping systems, etc., depending on the particular application.

Installed in the same position relative to the first on-off valve 28 is second on-off valve 30 next to it. In this case, valve 30 is also designed as a 2/2-way valve. The second on-off valve 30 has two lateral connections 44 and 46 which, like the transverse connection 42, extend laterally and radially out from the control block 24. The two lateral connections 44 and 46 are in turn separated from one another by the switching parts of the second on-off valve 30. When the second on-off valve 30 is switched through, the lateral connections 44 and 46 are connected together to carry fluid or are separated from one another with the valve in the blocking position. With the corresponding second on-off valve 30, it would then be possible, for example in an embodiment not shown here, to actuate of the entry and exit of the working gas in the gas chamber 12 to the extent that the connections 44 and 46 are connected to the gas chamber 12 in such a way as to carry fluid via connection points in the cover part 20. In another embodiment, not shown here, it could also be possible for the second on-off valve 30 to actuate another assembly in the hydraulic circuit, for example, in the form of a hydraulic working cylinder or the like.

In the illustrated embodiment, the on-off valves 28 and 30 are designed as magnetic valves 48 that can be actuated electrically by connections 50. Since the magnetic valves 48 are conventional, it is not necessary to describe them in further detail.

The hydraulic accumulator according to the present invention provides a complete solution that allows a compact design. In the embodiment shown, the first and second on-off valves 28 and 30 are axially arranged essentially parallel to the longitudinal axis 38 of the hydraulic accumulator in the control block 24. Other installation positions transverse to the longitudinal axis would, however, also be possible, especially in the radial direction. Since the accumulator housing 10 is in direct contact with the control block 24, leakage is avoided and expensive, labor-intensive pipework is not necessary. Since the control block 24 with its extension 32 extends directly into the fluid chamber 14 of the accumulator housing 10, in particular the first on-off valve 28 is located right next to the fluid chamber 14 and is separated only by the fluid channel 40. Fluid channel 40 is kept short by design so that very short activation times can be expected for the hydraulic accumulator.

While one embodiment has been chosen to illustrate the invention, it will be understood by those skilled in the art that various changes and modifications can be made therein without departing from the scope of the invention as defined in the appended claims.

What is claimed is:

1. A hydraulic accumulator, comprising:

a longitudinal axis;

an accumulator housing having at least one gas chamber and a fluid chamber therein;

a separating element movable in said housing in a direction of motion separating said gas chamber from said fluid chamber;

a valve control unit having a first on-off valve through which a pressure medium can pass to fill and drain one of said chambers, said first on-off valve being housed in a first valve recess and being movable between an open position and a closed position in said direction of motion;

a control block housing said valve control unit and being self-contained relative to said accumulator housing;

a second on-off valve located in a second valve recess in said control block performing a different switching operation from said first on-off valve, each of said valve recesses being arranged off-center from said longitudinal axis for modular installation of said on-off valves, said on-off valves and said valve recesses being substantially identical;

an extension of said control block directly contacting an inside surface of said accumulator housing and extending into said housing; and a shoulder on said control block contacting a free end of said accumulator housing, said shoulder extending from a location on said control block from which said extension projects.

2. A hydraulic accumulator according to claim 1 wherein said extension of said control block limits said fluid chamber; and said control block has at least one fluid channel with one free end opening into said fluid chamber and another free end connected to said first on-off valve.

3. A hydraulic accumulator according to claim 1 wherein said second on-off valve is connected to a gas chamber to control entry and discharge of working gas.

4. A hydraulic accumulator according to claim 1 wherein said second on-off valve is connected to and controls fluid flow to and from a fluid operated assembly.

5. A hydraulic accumulator according to claim 1 wherein said first and second on-off valves are 2/2-way valves.

6. A hydraulic accumulator according to claim 5 wherein said 2/2-way valves are electrically activated, magnetic valves.

7. A hydraulic accumulator according to claim 1 wherein said separating element is a separating piston.

8. A hydraulic accumulator according to claim 1 wherein said accumulator housing and said control block are each essentially cylindrical.

9. A hydraulic accumulator according to claim 1 wherein said first and second on-off valves can be switched regardless of positioning of said separating element in said accumulator housing, the positioning of said separating element in said accumulator housing being determined by pressures in said chambers.

* * * * *